US011929022B2

(12) United States Patent
Yuan et al.

(10) Patent No.: US 11,929,022 B2
(45) Date of Patent: Mar. 12, 2024

(54) MULTIPLEXING CIRCUITRY, MULTIPLEXING METHOD, MULTIPLEXING MODULE, AND DISPLAY DEVICE

(71) Applicants: Hefei BOE Joint Technology Co., Ltd., Anhui (CN); BOE Technology Group Co., Ltd., Beijing (CN)

(72) Inventors: Zhidong Yuan, Beijing (CN); Yongqian Li, Beijing (CN); Can Yuan, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/641,991

(22) PCT Filed: May 18, 2021

(86) PCT No.: PCT/CN2021/094234

§ 371 (c)(1),
(2) Date: Mar. 10, 2022

(87) PCT Pub. No.: WO2021/249130

PCT Pub. Date: Dec. 16, 2021

(65) Prior Publication Data

US 2024/0046858 A1 Feb. 8, 2024

(30) Foreign Application Priority Data

Jun. 10, 2020 (CN) ......................... 202010523269.3

(51) Int. Cl.
*G09G 3/3225* (2016.01)

(52) U.S. Cl.
CPC ... *G09G 3/3225* (2013.01); *G09G 2310/0297* (2013.01); *G09G 2310/08* (2013.01)

(58) Field of Classification Search
CPC ......... G09G 3/3225; G09G 2310/0297; G09G 2310/08
See application file for complete search history.

(56) References Cited

U.S. PATENT DOCUMENTS 9,852,674 B2 12/2017 Seo et al.
2005/0236650 A1 10/2005 Edwards et al.
(Continued)

FOREIGN PATENT DOCUMENTS

CN 1672187 A 9/2005
CN 104952420 A 9/2015
(Continued)

OTHER PUBLICATIONS

CN 202010523269.3 first office action.
PCT/CN2021/094234 international search report and written opinion.

*Primary Examiner* — Brent D Castiaux
(74) *Attorney, Agent, or Firm* — IPro, PLLC

(57) ABSTRACT

The present disclosure provides a multiplexing circuitry, a multiplexing method, a multiplexing module, and a display device. The multiplexing circuitry includes N multiplexing unit circuitries, N energy storage unit circuitries and N control unit circuitries. An $n^{th}$ multiplexing unit circuitry is configured to enable an $n^{th}$ output data line to be electrically coupled to or electrically decoupled from an input data line under the control of a potential at an $n^{th}$ control end; an $n^{th}$ energy storage unit circuitry is configured to control a potential at the $n^{th}$ control end in accordance with an $n^{th}$ clock signal; and an $n^{th}$ control unit circuitry is configured to enable the $n^{th}$ control end to be electrically coupled to or electrically decoupled from an $n^{th}$ switch control line in accordance with a control voltage signal and an $n^{th}$ switch control signal.

14 Claims, 5 Drawing Sheets

(56) References Cited

U.S. PATENT DOCUMENTS

| | | | | |
|---|---|---|---|---|
| 2016/0293093 | A1* | 10/2016 | Seo | G09G 3/20 |
| 2016/0329025 | A1 | 11/2016 | Park et al. | |
| 2019/0295469 | A1* | 9/2019 | Umezawa | G09G 3/3233 |
| 2019/0304396 | A1* | 10/2019 | Yamamoto | G09G 3/3688 |
| 2020/0027390 | A1 | 1/2020 | Lee et al. | |
| 2020/0027405 | A1 | 1/2020 | Lee et al. | |
| 2020/0160793 | A1 | 5/2020 | Cherng et al. | |
| 2020/0211489 | A1 | 7/2020 | Yamamoto | |

FOREIGN PATENT DOCUMENTS

| | | | |
|---|---|---|---|
| CN | 107705739 | A | 2/2018 |
| CN | 110322849 | A | 10/2019 |
| CN | 110738966 | A | 1/2020 |
| CN | 111145677 | A | 5/2020 |
| CN | 111554237 | A | 8/2020 |
| WO | 2019026170 | A1 | 2/2019 |
| WO | 2019044546 | A1 | 3/2019 |

* cited by examiner

MULTIPLEXING CIRCUITRY, MULTIPLEXING METHOD, MULTIPLEXING MODULE, AND DISPLAY DEVICE

CROSS-REFERENCE TO RELATED APPLICATION

This application is the U.S. national phase of PCT Application No. PCT/CN2021/094234 filed on May 18, 2021, which claims a priority of the Chinese patent application No. 202010523269.3 filed on Jun. 10, 2020, which is incorporated herein by reference in its entirety.

TECHNICAL FIELD

The present disclosure relates to the field of multiplexing technology, in particular to a multiplexing circuitry, a multiplexing method, a multiplexing module, and a display device.

BACKGROUND

In the field of display technology, liquid crystal display technology and active matrix Organic Light-Emitting Diode (OLED) display technology are mature. In a whole display system, usually for an OLED display product, a spectrum at various wavelengths is excited through direct combination of electrons and holes, so as to form patterns. An OLED display device is expected to become a next-generation mainstream display product due to such advantages as rapid response and maximum contrast.

Generally, the OLED display device includes a display panel, a gate driving unit, a data driver, and a timing controller. The display panel includes a data line, a gate line and pixels controlled by the data line and the gate line. As an operating mode, when a gate driving signal is applied to the gate line, a data voltage is applied to each pixel in a certain row through the data line, and the pixels emit light with different brightness values in accordance with the data voltages. The gate driving unit is configured to apply a gate signal to the gate line, and it includes a separate gate driving integrated circuitry or a panel gate driving circuitry.

In the case of high Pixels Per Inch (PPI), the quantity of pixels increases, so the quantity of signal lines increases too. Due to an upper limit of the capability of a module bonding process, it is impossible to reduce a bonding pad pitch of a Chip On Film (COF) unlimitedly so as to meet the requirement on the display at a high PPI. Through a multiplexing circuitry, the quantity of signals on the COF may be reduced effectively, so the multiplexing circuitry is frequently used in the case of the high PPI. However, with an increase in the quantity of pixels, the signal lines in the display panel cross each other in a dense manner, and an RC loading of each signal line also increases. In addition, the multiplexing circuitry has such a disadvantage of current limiting, so the output capacity of the multiplexing circuitry is low.

SUMMARY

In one aspect, the present disclosure provides in some embodiments a multiplexing circuitry, including N multiplexing unit circuitries, N energy storage unit circuitries and N control unit circuitries, N being an integer greater than 1. A control end of an $n^{th}$ multiplexing unit circuitry is electrically coupled to an $n^{th}$ control end, a first end of the $n^{th}$ multiplexing unit circuitry is electrically coupled to an $n^{th}$ output data line, a second end of the $n^{th}$ multiplexing unit circuitry is electrically coupled to an input data line, and the $n^{th}$ multiplexing unit circuitry is configured to enable the $n^{th}$ output data line to be electrically coupled to or electrically decoupled from the input data line under the control of a potential at the $n^{th}$ control end. A first end of an $n^{th}$ energy storage unit circuitry is electrically coupled to an $n^{th}$ clock signal end, a second end of the $n^{th}$ energy storage unit circuitry is electrically coupled to the $n^{th}$ control end, the $n^{th}$ energy storage unit circuitry is configured to control the potential at the $n^{th}$ control end in accordance with an $n^{th}$ clock signal, and the $n^{th}$ clock signal end is configured to provide the $n^{th}$ clock signal. An $n^{th}$ control unit circuitry is electrically coupled to a control voltage end, the $n^{th}$ control end and an $n^{th}$ switch control line and is configured to enable the $n^{th}$ control end to be electrically coupled to or electrically decoupled from the $n^{th}$ switch control line in accordance with a control voltage signal and an $n^{th}$ switch control signal, the control voltage end is configured to provide the control voltage signal, and the $n^{th}$ switch control line is configured to provide the $n^{th}$ switch control signal, where n is a positive integer less than or equal to N.

In a possible embodiment of the present disclosure, the $n^{th}$ energy storage unit circuitry includes an $n^{th}$ storage capacitor, a first end of the $n^{th}$ storage capacitor is electrically coupled to the $n^{th}$ clock signal end, and a second end of the $n^{th}$ storage capacitor is electrically coupled to the $n^{th}$ control end.

In a possible embodiment of the present disclosure, the $n^{th}$ control unit circuitry includes an $n^{th}$ control transistor, a control electrode of the $n^{th}$ control transistor is electrically coupled to the control voltage end, a first electrode of the $n^{th}$ control transistor is electrically coupled to the $n^{th}$ switch control line, and a second electrode of the $n^{th}$ control transistor is electrically coupled to the $n^{th}$ control end.

In a possible embodiment of the present disclosure, the $n^{th}$ control transistor is an n-type transistor, and the control voltage signal is a high voltage signal; or the $n^{th}$ control transistor is a p-type transistor, and the control voltage signal is a low voltage signal.

In a possible embodiment of the present disclosure, the $n^{th}$ multiplexing unit circuitry includes an $n^{th}$ multiplexing transistor, a control electrode of the $n^{h}$ multiplexing transistor is electrically coupled to the $n^{th}$ control end, a first electrode of the $n^{th}$ multiplexing transistor is electrically coupled to the $n^{th}$ output data line, and a second electrode of the $n^{th}$ multiplexing transistor is electrically coupled to the input data line.

In another aspect, the present disclosure provides in some embodiments a multiplexing method for the above-mentioned multiplexing circuitry, including: enabling, by the $n^{th}$ multiplexing unit circuitry, the $n^{th}$ output data line to be electrically coupled to or electrically decoupled from the input data line under the control of the potential at the $n^{th}$ control end; controlling, by the $n^{th}$ energy storage unit circuitry, the potential at the $n^{th}$ control end in accordance with the $n^{th}$ clock signal; enabling, by the $n^{th}$ control unit circuitry, the $n^{th}$ control end to be electrically coupled to or electrically decoupled from the $n^{th}$ switch control line in accordance with the control voltage signal and the $n^{th}$ switch control signal, N being an integer greater than 1, and n being a positive integer less than or equal to N.

In a possible embodiment of the present disclosure, the multiplexing method further includes: providing, by the $n^{th}$ switch control line, a first voltage signal, and enabling a potential of the $n^{th}$ clock signal to be changed from a second voltage to a first voltage, so as to change, by the $n^{th}$ energy storage unit circuitry, the potential at the $n^{th}$ control end, enable, by the $n^{th}$ multiplexing unit circuitry, the $n^{th}$ output data line to be electrically coupled to the input data line under the control of the potential at the $n^{th}$ control end, and enable, by the $n^{th}$ control unit circuitry, the $n^{th}$ control end o be electrically decoupled from the $n^{th}$ switch control line in accordance with the control voltage signal and the $n^{th}$ switch control signal; and enabling the potential of the $n^{th}$ clock signal to be changed from the first voltage to the second voltage, and providing, by the $n^{th}$ switch control line, a second voltage signal, so as to change, by the $n^{th}$ energy storage unit circuitry, the potential at the $n^{th}$ control end, enable, by the $n^{th}$ control unit circuitry, the $n^{th}$ control end to be electrically coupled to the $n^{th}$ switch control line in accordance with the control voltage signal and an $n^{th}$ switch control signal to discharge the $n^{th}$ control end, and enable, by the $n^{th}$ multiplexing unit circuitry, the $n^{th}$ output data line to be electrically decoupled from the input data line under the control of the potential at the $n^{th}$ control end.

In a possible embodiment of the present disclosure, the $n^{th}$ control transistor in the $n^{th}$ control unit circuitry is an n-type transistor, the $n^{th}$ multiplexing transistor in the $n^{th}$ multiplexing unit circuitry is an n-type transistor, the first voltage is a high voltage, and the second voltage is a low voltage; or the $n^{th}$ control transistor is a p-type transistor, the $n^{th}$ multiplexing transistor is a p-type transistor, the first voltage is a low voltage, and the second voltage is a high voltage.

In yet another aspect, the present disclosure provides in some embodiments a multiplexing module including a plurality of the above-mentioned multiplexing circuitries.

In still yet another aspect, the present disclosure provides in some embodiments a display device including the above-mentioned multiplexing module.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

The present disclosure provides in some embodiments a multiplexing circuitry, including N multiplexing unit circuitries, N energy storage unit circuitries and N control unit circuitries, where N is an integer greater than 1.

Figure 1:
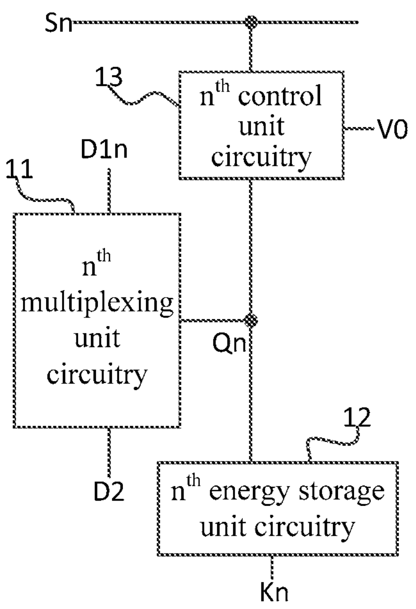
FIG. 1 is a schematic view showing an $n^{th}$ multiplexing unit circuitry in a multiplexing circuitry according to one embodiment of the present disclosure.

As shown in FIG. 1, a control end of an $n^{th}$ multiplexing unit circuitry 11 is electrically coupled to an $n^{th}$ control end Qn, a first end of the $n^{th}$ multiplexing unit circuitry 11 is electrically coupled to an $n^{th}$ output data line D1n, a second end of the $n^{th}$ multiplexing unit circuitry 11 is electrically coupled to an input data line D2, and the $n^{th}$ multiplexing unit circuitry 11 is configured to enable the $n^{th}$ output data line D1n to be electrically coupled to or electrically decoupled from the input data line D2 under the control of a potential at the $n^{th}$ control end Qn. A first end of an $n^{th}$ energy storage unit circuitry 12 is electrically coupled to an $n^{th}$ clock signal end Kn, a second end of the $n^{th}$ energy storage unit circuitry 12 is electrically coupled to the $n^{th}$ control end Qn, the $n^{th}$ energy storage unit circuitry 12 is configured to control the potential at the $n^{th}$ control end Qn in accordance with an $n^{th}$ clock signal, and the $n^{th}$ clock signal end Kn is configured to provide the $n^{th}$ clock signal. An $n^{th}$ control unit circuitry 13 is electrically coupled to a control voltage end V0, the $n^{th}$ control end Qn and an $n^{h}$ switch control line Sn, and is configured to enable the $n^{th}$ control end Qn to be electrically coupled to or electrically decoupled from the $n^{th}$ switch control line Sn in accordance with a control voltage signal and an $n^{th}$ switch control signal, the control voltage end V0 is configured to provide the control voltage signal, and the $n^{th}$ switch control line Sn is configured to provide the $n^{th}$ switch control signal, where n is a positive integer less than or equal to N.

In the embodiments of the present disclosure, the input data line is configured to provide an $n^{th}$ input data voltage.

According to the multiplexing circuitry in the embodiments of the present disclosure, when the $n^{th}$ switch control line provides a first voltage signal, the potential at the $n^{th}$ control end is further pulled up or down through the $n^{th}$ energy storage unit circuitry and the $n^{th}$ control unit circuitry in accordance with the $n^{th}$ clock signal, so it is able to improve the output capability of the $n^{th}$ multiplexing unit circuitry.

In the embodiments of the present disclosure, when the transistor in the $n^{th}$ multiplexing unit circuitry is an n-type transistor, it is able for the multiplexing circuitry to pull up the potential at the $n^{th}$ control end, thereby to improve the output capability of the $n^{th}$ multiplexing unit circuitry. When the transistor in the $n^{th}$ multiplexing unit circuitry is a p-type transistor, it is able for the multiplexing circuitry to pull down the potential at the $n^{th}$ control end, thereby to improve the output capability of the $n^{th}$ multiplexing unit circuitry.

In the embodiments of the present disclosure, when the transistor in the $n^{th}$ multiplexing unit circuitry is an n-type transistor, the first voltage signal is, but not limited to, a high voltage signal.

In the embodiments of the present disclosure, when the transistor in the $n^{th}$ multiplexing unit circuitry is a p-type transistor, the first voltage signal is, but not limited to, a low voltage signal.

In the embodiments of the present disclosure, during the operation of the multiplexing circuitry, the $n^{th}$ switch control line Sn provides the first voltage signal, and a potential of the $n^{th}$ clock signal is changed from a second voltage to the first voltage, so as to change, by the $n^{th}$ energy storage unit circuitry 12, the potential at the $n^{th}$ control end Qn, enable, by the $n^{th}$ multiplexing unit circuitry 11, the $n^{th}$ output data line D1n to be electrically coupled to the input data line D2 under the control of the potential at the $n^{th}$ control end Qn, and enable, by the $n^{th}$ control unit circuitry 13, the $n^{th}$ control end Qn to be electrically decoupled from the $n^{th}$ switch control line Sn in accordance with the control voltage signal and the $n^{th}$ switch control signal. The potential of the $n^{th}$ clock signal is changed from the first voltage to the second voltage, and the $n^{th}$ switch control line Sn provides a second voltage signal, so as to change, by the $n^{th}$ energy storage unit circuitry 12, the potential at the $n^{th}$ control end Qn, enable, by the $n^{th}$ control unit circuitry 13, the $n^{th}$ control end Qn to be electrically coupled to the $n^{th}$ switch control line Sn in accordance with the control voltage signal and an $n^{th}$ switch control signal to discharge the $n^{th}$ control end Qn, and enable, by the $n^{th}$ multiplexing unit circuitry 11, the $n^{th}$ output data line D1n to be electrically decoupled from the input data line D2 under the control of the potential at the $n^{th}$ control end Qn.

In the embodiments of the present disclosure, when the transistor in the $n^{th}$ multiplexing unit circuitry is an n-type transistor, the second voltage signal is, but not limited to, a low voltage signal.

In the embodiments of the present disclosure, when the transistor in the $n^{th}$ multiplexing unit circuitry is a p-type transistor, the second voltage signal is, but not limited to, a high voltage signal.

In the embodiments of the present disclosure, the $n^{th}$ energy storage unit circuitry includes an $n^{th}$ storage capacitor, a first end of the $n^{th}$ storage capacitor is electrically coupled to the $n^{th}$ clock signal end, and a second end of the $n^{th}$ storage capacitor is electrically coupled to the $n^{th}$ control end.

In the embodiments of the present disclosure, the $n^{th}$ control unit circuitry includes an $n^{th}$ control transistor, a control electrode of the $n^{th}$ control transistor is electrically coupled to the control voltage end, a first electrode of the $n^{th}$ control transistor is electrically coupled to the $n^{th}$ switch control line, and a second electrode of the $n^{th}$ control transistor is electrically coupled to the $n^{th}$ control end.

In the embodiments of the present disclosure, the $n^{th}$ control transistor is an n-type transistor, and the control voltage signal is a high voltage signal; or the $n^{th}$ control transistor is a p-type transistor, and the control voltage signal is a low voltage signal.

In the embodiments of the present disclosure, the $n^{th}$ multiplexing unit circuitry includes an $n^{th}$ multiplexing transistor, a control electrode of the $n^{th}$ multiplexing transistor is electrically coupled to the $n^{th}$ control end, a first electrode of the $n^{th}$ multiplexing transistor is electrically coupled to the $n^{th}$ output data line, and a second electrode of the $n^{th}$ multiplexing transistor is electrically coupled to the input data line.

Figure 2:
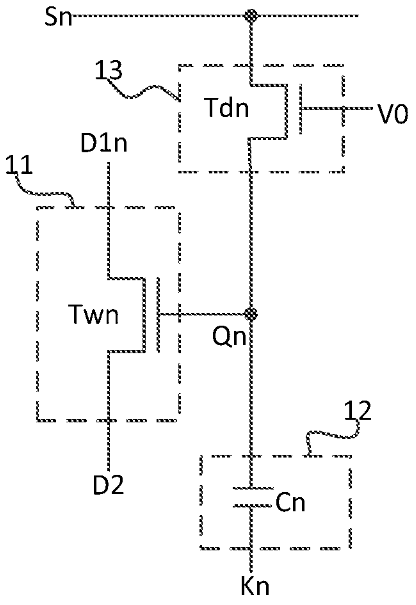
FIG. 2 is a circuit diagram of the $n^{th}$ multiplexing unit circuitry according to one embodiment of the present disclosure.

As shown in FIG. 2, based on the multiplexing circuitry in FIG. 1, the $n^{th}$ energy storage unit circuitry 12 includes an $n^{th}$ storage capacitor Cn, a first end of the $n^{th}$ storage capacitor Cn is electrically coupled to the $n^{th}$ clock signal end Kn, and a second end of the $n^{th}$ storage capacitor Cn is electrically coupled to the $n^{th}$ control end Qn. The $n^{th}$ control unit circuitry 13 includes an $n^{th}$ control transistor Tdn, a control electrode of the $n^{th}$ control transistor Tdn is electrically coupled to the control voltage end V0, a source electrode of the $n^{th}$ control transistor Tdn is electrically coupled to the $n^{th}$ switch control line Sn, and a drain electrode of the $n^{th}$ control transistor Tdn is electrically coupled to the $n^{th}$ control end Qn. The $n^{th}$ multiplexing unit circuitry 11 includes an $n^{th}$ multiplexing transistor Twn, a gate electrode of the $n^{th}$ multiplexing transistor Twn is electrically coupled to the $n^{th}$ control end Qn, a source electrode of the $n^{th}$ multiplexing transistor Twn is electrically coupled to the $n^{th}$ output data line D1n, and a drain electrode of the $n^{th}$ multiplexing transistor Twn is electrically coupled to the input data line D2.

In the embodiments of the present disclosure, as shown in FIG. 2, a control voltage provided by the control voltage end V0 is, but not limited to, a direct current high voltage. In actual use, a voltage value of the direct current high voltage should not be greater than a high voltage value of the $n^{th}$ switch control signal on the $n^{th}$ switch control line.

In the embodiments of the present disclosure, the high voltage value of the $n^{th}$ switch control signal refers to a voltage value of the $n^{th}$ switch control signal when the $n^{th}$ switch control signal is a high voltage signal.

In the embodiments of the present disclosure, as shown in FIG. 2, all of the transistors are, but not limited to, n-type thin film transistors. In actual use, the transistor is an n-type transistor or a p-type transistor.

Figure 3:
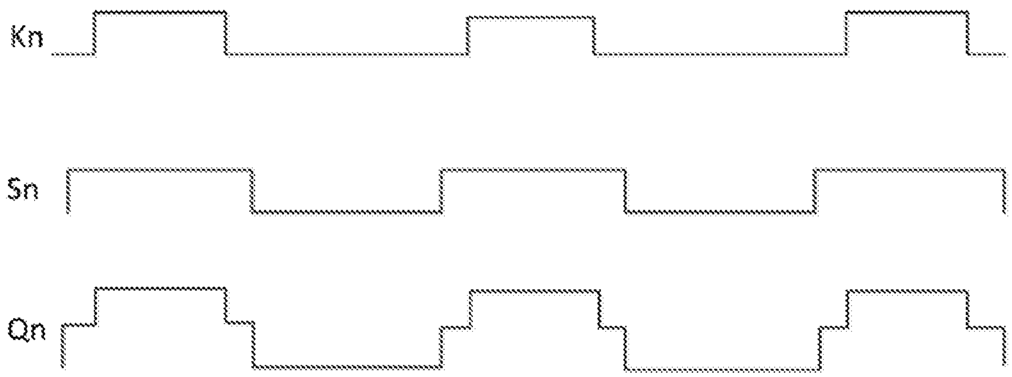
FIG. 3 is a sequence diagram of the $n^{th}$ multiplexing unit circuitry according to one embodiment of the present disclosure.

As shown in FIG. 3, during the operation of the multiplexing circuitry in FIG. 2, Sn provides a high voltage, and a potential of the $n^{th}$ clock signal provided by Kn is changed from a low voltage to a high voltage. Due to the existence of Cn, the potential at Qn is coupled to a higher voltage, and a gate voltage of Tdn is the same as the high voltage provided by Sn. At this time, a gate-to-source voltage of Tdn is close to 0V, Tdn is in an off state, and Qn is maintained at a higher potential, so as to improve the driving capability of Twn. Twn is turned on, and D2 provides the $n^{th}$ input data voltage to D1n. When the $n^{th}$ input data voltage is a high voltage, a rising edge time of the output data voltage on D1n is decreased, that is, the $n^{th}$ output data voltage may be transmitted to D1n more rapidly.

The potential of the $n^{th}$ clock signal provided by Kn is changed from a high voltage to a low voltage, and Sn provides a low voltage signal, so Cn pulls down the potential at Qn to turn on Tdn for discharging Qn. Twn is turn off to enable D1n to be electrically decoupled from D2.

Figure 4:
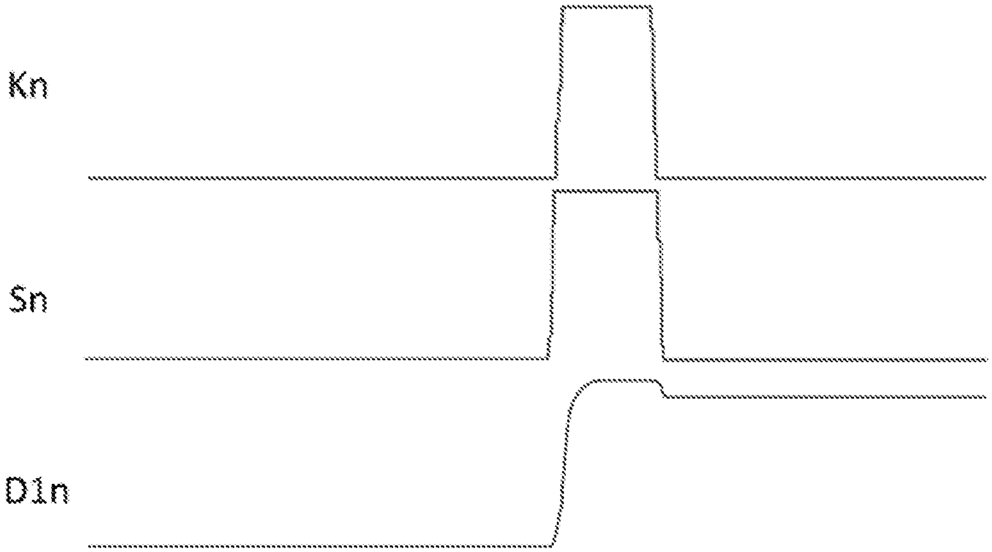
FIG. 4 is a simulation sequence diagram of the $n^{th}$ multiplexing unit circuitry according to one embodiment of the present disclosure.

FIG. 4 is a simulation timing diagram of the multiplexing circuitry in FIG. 2. Through simulation, a rise time of the output data voltage on D1n is 0.056 μs, while a rise time of the output data voltage of the conventional multiplexing circuitry is 0.77 μs.

Figure 5:
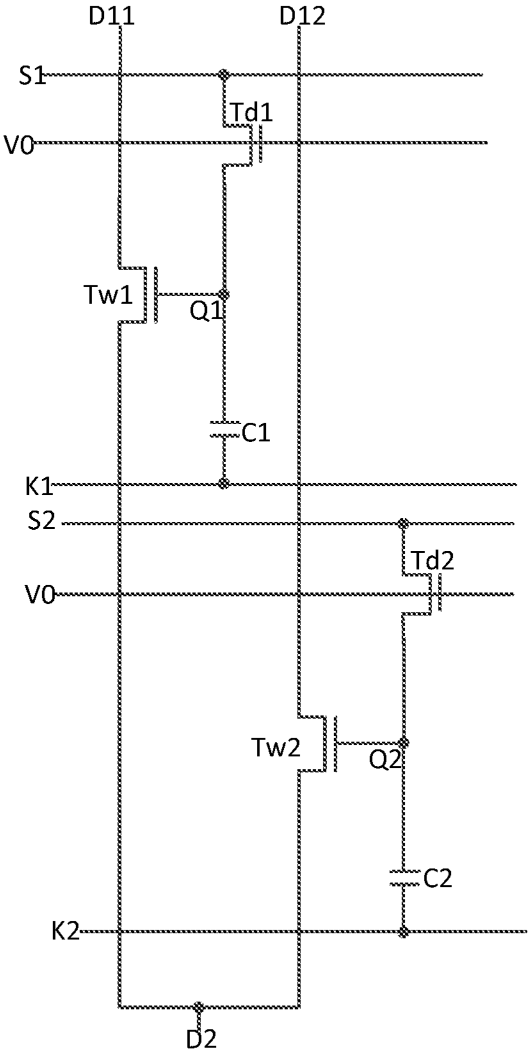
FIG. 5 is a circuit diagram of the multiplexing circuitry according to one embodiment of the present disclosure.

As shown in FIG. 5, N is equal to 2. In the embodiments of the present disclosure, the multiplexing circuitry includes a first multiplexing unit circuitry, a first energy storage unit circuitry, a first control unit circuitry, a second multiplexing unit circuitry, a second energy storage unit circuitry, and a second control unit circuitry.

The first energy storage unit circuitry includes a first storage capacitor C1, a first end of the first storage capacitor C1 is electrically coupled to a first clock signal end K1, and a second end of the first storage capacitor C1 is electrically coupled to the first control end Q1. The first control unit circuitry includes a first control transistor Td1, a gate electrode of the first control transistor Td1 is electrically coupled to the control voltage end V0, a source electrode of the first control transistor Td1 is electrically coupled to a first switch control line S1, and a drain electrode of the first control transistor Td1 is electrically coupled to the first control end Q1. The first multiplexing unit circuitry includes a first multiplexing transistor Tw1, a gate electrode of the first multiplexing transistor Tw1 is electrically coupled to the first control end Q1, a source electrode of the first multiplexing transistor Tw1 is electrically coupled to a first output data line D11, and a drain electrode of the first multiplexing transistor Tw1 is electrically coupled to the input data line D2.

The second energy storage unit circuitry includes a second storage capacitor C2, a first end of the second storage capacitor C2 is electrically coupled to a second clock signal end K2, and a second end of the second storage capacitor C2 is electrically coupled to the second control end Q2. The second control unit circuitry includes a second control transistor Td2, a gate electrode of the second control transistor Td2 is electrically coupled to a high voltage end, a source electrode of the second control transistor Td2 is electrically coupled to a second switch control line S2, and a drain electrode of the second control transistor Td2 is electrically coupled to the second control end Q2. The second multiplexing unit circuitry includes an second multiplexing transistor Tw2, a gate electrode of the second multiplexing transistor Tw2 is electrically coupled to the second control end Q2, a source electrode of the second multiplexing transistor Tw2 is electrically coupled to a second output data line D12, and a drain electrode of the second multiplexing transistor Tw2 is electrically coupled to the input data line D2.

For the multiplexing circuitry in FIG. 5, all of the transistors are, but not limited to, n-type thin film transistors.

In the embodiments of the present disclosure, the first switch control line S1 is configured to provide a first switch control signal, and the second switch control line S2 is configured to provide a second switch control signal.

In the embodiments of the present disclosure, as shown in FIG. 5, a control voltage provided by the control voltage end V0 is, but not limited to, a direct current high voltage. In actual use, a voltage value of the direct current high voltage should not be greater than a high voltage value of the first switch control signal, and the voltage value of the direct current high voltage should not be greater than a high voltage value of the second switch control signal.

Figure 6:
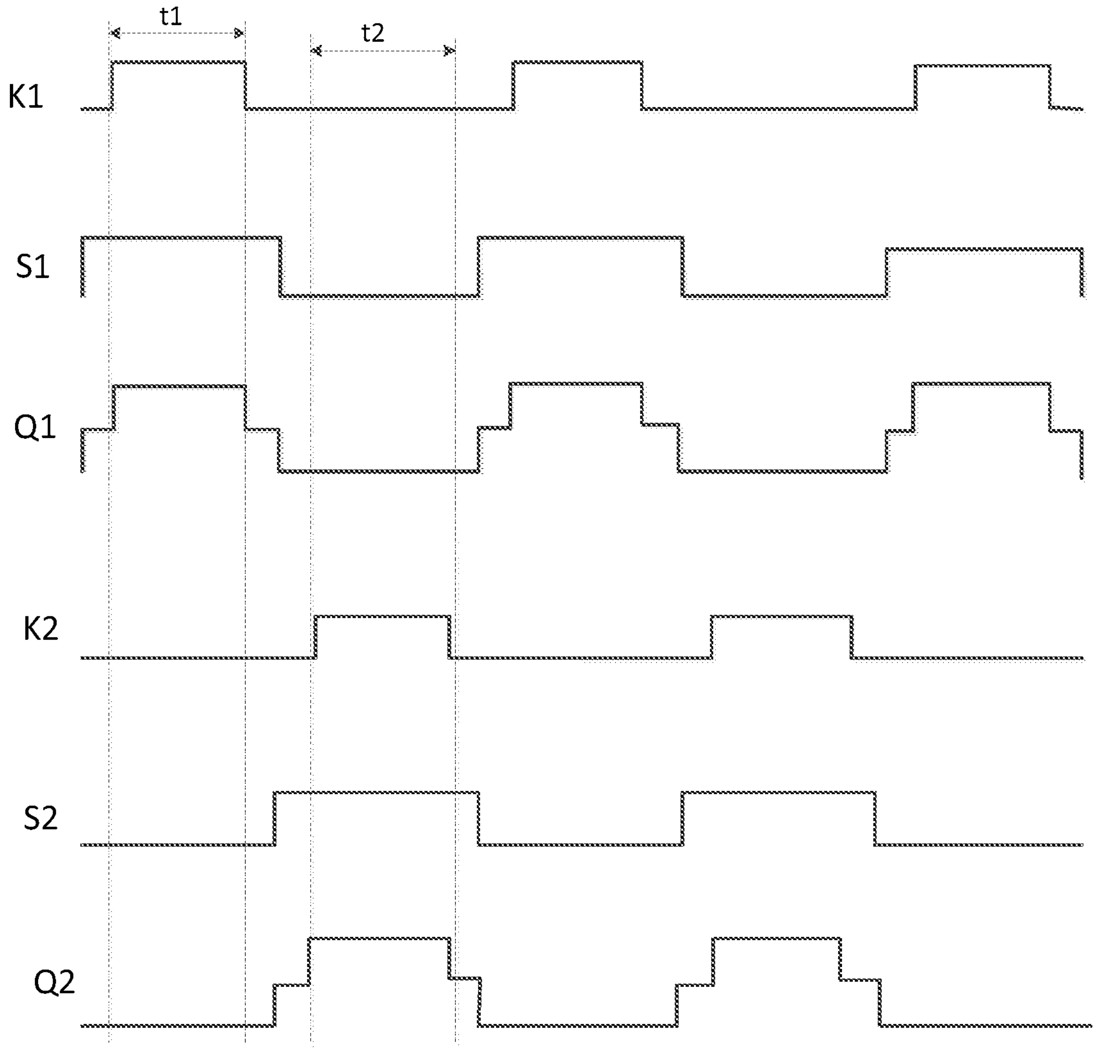
FIG. 6 is a sequence diagram of the multiplexing circuitry according to one embodiment of the present disclosure.

As shown in FIG. 6, in the embodiments of the present disclosure, during the operation of the multiplexing circuitry in FIG. 5, at a first multiplexing phase t1, S1 provides a high voltage, and a potential of the first clock signal provided by K1 is changed from a low voltage to a high voltage. Due to the existence of C1, the potential at Q1 is coupled to a higher voltage, and a gate voltage of Td1 is the same as the high voltage provided by S1. At this time, a gate-to-source voltage of Td1 is close to 0V, Td1 is in an off state, and Q1 is maintained at a higher potential, so as to improve the driving capability of Tw1. Tw1 is turned on, so D2 provides the first input data voltage to D11.

At the first multiplexing phase t1, S2 provides a low voltage, and K2 provides a low voltage, so as to turn on Td2. The potential at Q2 is a low voltage, so as to turn off Tw2, thereby to enable D12 to be electrically decoupled from D2.

At a second multiplexing phase t2, S2 provides a high voltage, and the potential of the second clock signal provided by K2 is changed from a low voltage to a high voltage. Due to the existence of C2, the potential at Q2 is coupled to a higher voltage, and a gate voltage of Td2 is the same as the high voltage provided by S2. At this time, a gate-to-source voltage of Td2 is close to 0V, Td2 is in an off state, and Q2 is maintained at a higher potential, so as to improve the driving capability of Tw2. Tw2 is turned on, so D2 provides the second input data voltage to D12.

At the second multiplexing phase t2, S1 provides a low voltage, and K1 provides a low voltage, so as to turn on Td1. The potential at Q1 is a low voltage, so as to turn off Tw1, thereby to enable D11 to be electrically decoupled from D2.

The present disclosure further provides in some embodiments a multiplexing method for the above-mentioned multiplexing circuitry. The multiplexing method includes: enabling, by the $n^{th}$ multiplexing unit circuitry, the $n^{th}$ output data line to be electrically coupled to or electrically decoupled from the input data line under the control of the potential at the $n^{th}$ control end; controlling, by the $n^{th}$ energy storage unit circuitry, the potential at the $n^{th}$ control end in accordance with the $n^{th}$ clock signal; enabling, by the $n^{th}$ control unit circuitry, the $n^{th}$ control end to be electrically coupled to or electrically decoupled from the $n^{th}$ switch control line in accordance with the control voltage signal and the $n^{th}$ switch control signal, N being an integer greater than 1, and n being a positive integer less than or equal to N.

According to the multiplexing method in the embodiments of the present disclosure, when the $n^{th}$ switch control line provides a first voltage signal, the potential at the $n^{th}$ control end is further pulled up or down through the $n^{th}$ energy storage unit circuitry and the $n^{th}$ control unit circuitry in accordance with the $n^{th}$ clock signal, so it is able to improve the output capability of the $n^{th}$ multiplexing unit circuitry.

During the implementation, the multiplexing method specifically includes: providing, by the $n^{th}$ switch control line, a first voltage signal, and enabling a potential of the $n^{th}$ clock signal to be changed from a second voltage to a first voltage, so as to change, by the $n^{th}$ energy storage unit circuitry, the potential at the $n^{th}$ control end, enable, by the $n^{th}$ multiplexing unit circuitry, the $n^{th}$ output data line to be electrically coupled to the input data line under the control of the potential at the $n^{th}$ control end, and enable, by the $n^{th}$ control unit circuitry, the $n^{th}$ control end o be electrically decoupled from the $n^{th}$ switch control line in accordance with the control voltage signal and the $n^{th}$ switch control signal; and enabling the potential of the $n^{th}$ clock signal to be changed from the first voltage to the second voltage, and providing, by the $n^{th}$ switch control line, a second voltage signal, so as to change, by the $n^{th}$ energy storage unit circuitry, the potential at the $n^{th}$ control end, enable, by the $n^{h}$ control unit circuitry, the $n^{th}$ control end to be electrically coupled to the $n^{th}$ switch control line in accordance with the control voltage signal and an $n^{th}$ switch control signal to discharge the $n^{th}$ control end, and enable, by the $n^{th}$ multiplexing unit circuitry, the $n^{th}$ output data line to be electrically decoupled from the input data line under the control of the potential at the $n^{th}$ control end.

In a possible embodiment of the present disclosure, the $n^{th}$ control transistor in the $n^{th}$ control unit circuitry is an n-type transistor, the $n^{th}$ multiplexing transistor in the $n^{th}$ multiplexing unit circuitry is an n-type transistor, the first voltage is a high voltage, and the second voltage is a low voltage; or the $n^{th}$ control transistor is a p-type transistor, the $n^{th}$ multiplexing transistor is a p-type transistor, the first voltage is a low voltage, and the second voltage is a high voltage.

The present disclosure further provides in some embodiments a multiplexing module, including a plurality of the above-mentioned multiplexing circuitries.

Figure 7:
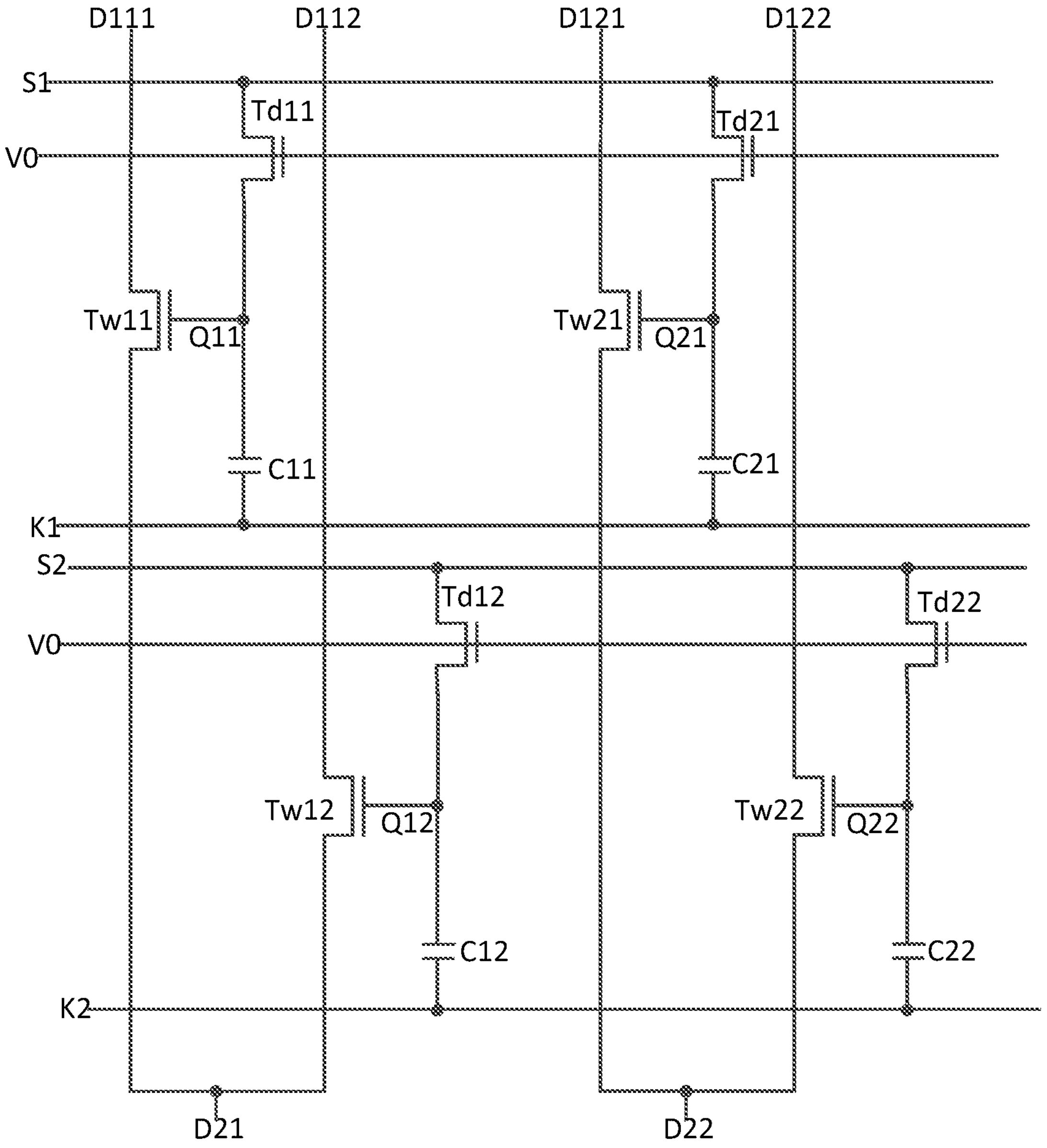
FIG. 7 is a circuit diagram of a multiplexing module according to one embodiment of the present disclosure.

As shown in FIG. 7, the description will be given when N is equal to 2, i.e., the multiplexing module includes two multiplexing circuitries.

As shown in FIG. 7, in the embodiments of the present disclosure, the multiplexing module includes a first multiplexing circuitry and a second multiplexing circuitry.

The first multiplexing circuitry includes a first multiplexing unit circuitry, a first energy storage unit circuitry, a first control unit circuitry, a second multiplexing unit circuitry, a second energy storage unit circuitry, and a second control unit circuitry.

The first energy storage unit circuitry includes a first one of first storage capacitors C11, a first end of C11 is electrically coupled to the first clock signal end K1, and a second end of C11 is electrically coupled to a first one of first control end Q11s. The first control unit circuitry includes a first one of first control transistors Td11, a gate electrode of Td11 is electrically coupled to the control voltage end V0, a source electrode of Td11 is electrically coupled to the first switch control line S1, and a drain electrode of Td11 is electrically coupled to Q11. The first multiplexing unit circuitry includes a first one of first multiplexing transistors Tw11, a gate electrode of Tw11 is electrically coupled to Q11, a source electrode of Tw11 is electrically coupled to a first the first output data line D111, and a drain electrode of Tw11 is electrically coupled to a first input data line D21.

The second energy storage unit circuitry includes a first one of second storage capacitors C12, a first end of C12 is electrically coupled to the second clock signal end K2, and a second end of C11 is electrically coupled to a first one of second control ends Q12. The second control unit circuitry includes a first one of second control transistors Td12, a gate electrode of Td12 is electrically coupled to the high voltage end, a source electrode of Td12 is electrically coupled to the second switch control line S2, and a drain electrode of Td12 is electrically coupled to Q12. The second multiplexing unit circuitry includes a first one of second multiplexing transistors Tw12, a gate electrode of Tw11 is electrically coupled to Q12, a source electrode of the Tw11 is electrically coupled to a first one of second output data lines D112, and a drain electrode of Tw12 is electrically coupled to a first input data line D21.

The second multiplexing circuitry includes a third multiplexing unit circuitry, a third energy storage unit circuitry, a third control unit circuitry, a fourth multiplexing unit circuitry, a fourth energy storage unit circuitry, and a fourth control unit circuitry.

The third energy storage unit circuitry includes a second one of the first storage capacitors C21, a first end of C21 is electrically coupled to the first clock signal end K1, and a second end of C21 is electrically coupled to a second one of the first control ends Q21. The third control unit circuitry includes a second one of the first control transistors Td21, a gate electrode of Td21 is electrically coupled to the control voltage end V0, a source electrode of Td21 is electrically coupled to the first switch control line S1, and a drain electrode of Td21 is electrically coupled to Q21. The third multiplexing unit circuitry includes a second one of the first multiplexing transistors Tw21, a gate electrode of Tw21 is electrically coupled to Q21, a source electrode of Tw21 is electrically coupled to a second one of the first output data lines D121, and a drain electrode of Tw21 is electrically coupled to a second input data line D22.

The fourth energy storage unit circuitry includes a second one of the second storage capacitors C22, a first end of C22 is electrically coupled to the second clock signal end K2, and a second end of C22 is electrically coupled to a second one of the second control ends Q22. The fourth control unit circuitry includes a second one of the second control transistors Td22, a gate electrode of Td22 is electrically coupled to the high voltage end, a source electrode of Td22 is electrically coupled to the second switch control line S2, and a drain electrode of Td22 is electrically coupled to Q22. The fourth multiplexing unit circuitry includes a second one of the second multiplexing transistors Tw22, a gate electrode of Tw22 is electrically coupled to Q22, a source electrode of Tw22 is electrically coupled to a second one of the second output data lines D122, and a drain electrode of Tw22 is electrically coupled to a second input data line D22.

In FIG. 7, all of the transistors are, but not limited to, n-type thin film transistors.

In the embodiments of the present disclosure, the first switch control line S1 is configured to provide a first switch control signal, and the second switch control line S2 is configured to provide a second switch control signal.

In the embodiments of the present disclosure, as shown in FIG. 7, control voltage provided by the control voltage end V0 is, but not limited to, a direct current high voltage. In actual use, a voltage value of the direct current high voltage should not be greater than a high voltage value of the first switch control signal, and the voltage value of the direct current high voltage should not be greater than a high voltage value of the second switch control signal.

The present disclosure further provides in some embodiments a display device, including the above-mentioned multiplexing module.

The display device may be any product or member having a display function, such as a mobile phone, a tablet computer, a television, a monitor, a laptop, a digital photo frame, or a navigator.

The above embodiments are for illustrative purposes only, it should be appreciated that, a person skilled in the art may make further modifications and improvements without departing from the spirit of the present disclosure, and these modifications and improvements shall also fall within the scope of the present disclosure.

What is claimed is:

1. A multiplexing circuitry, comprising N multiplexing unit circuitries, N energy storage unit circuitries and N control unit circuitries, N being an integer greater than 1, wherein a control end of an $n^{th}$ multiplexing unit circuitry is electrically coupled to an $n^{th}$ control end, a first end of the $n^{th}$ multiplexing unit circuitry is electrically coupled to an $n^{th}$ output data line, a second end of the $n^{th}$ multiplexing unit circuitry is electrically coupled to an input data line, and the $n^{th}$ multiplexing unit circuitry is configured to enable the $n^{th}$ output data line to be electrically coupled to or electrically decoupled from the input data line under the control of a potential at the $n^{th}$ control end;

a first end of an $n^{th}$ energy storage unit circuitry is electrically coupled to an $n^{th}$ clock signal end, a second end of the $n^{th}$ energy storage unit circuitry is electrically coupled to the $n^{th}$ control end, the $n^{th}$ energy storage unit circuitry is configured to control the potential at the $n^{th}$ control end in accordance with an $n^{th}$ clock signal, and the $n^{th}$ clock signal end is configured to provide the $n^{th}$ clock signal; and an $n^{th}$ control unit circuitry is electrically coupled to a control voltage end, the $n^{th}$ control end and an $n^{th}$ switch control line and is configured to enable the $n^{th}$ control end to be electrically coupled to or electrically decoupled from the $n^{th}$ switch control line in accordance with a control voltage signal and an $n^{th}$ switch control signal, the control voltage end is configured to provide the control voltage signal, and the $n^{th}$ switch control line is configured to provide the $n^{th}$ switch control signal, where n is a positive integer less than or equal to N.

2. The multiplexing circuitry according to claim 1, wherein the $n^{th}$ energy storage unit circuitry comprises an $n^{th}$ storage capacitor, a first end of the $n^{th}$ storage capacitor is electrically coupled to the $n^{th}$ clock signal end, and a second end of the $n^{th}$ storage capacitor is electrically coupled to the $n^{th}$ control end.

3. The multiplexing circuitry according to claim 1, wherein the $n^{th}$ control unit circuitry comprises an $n^{th}$ control transistor, a control electrode of the $n^{th}$ control transistor is electrically coupled to the control voltage end, a first electrode of the $n^{th}$ control transistor is electrically coupled to the $n^{th}$ switch control line, and a second electrode of the $n^{th}$ control transistor is electrically coupled to the $n^{th}$ control end.

4. The multiplexing circuitry according to claim 3, wherein the $n^{th}$ control transistor is an n-type transistor, and the control voltage signal is a high voltage signal; or the $n^{th}$ control transistor is a p-type transistor, and the control voltage signal is a low voltage signal.

5. The multiplexing circuitry according to claim 1, wherein the $n^{th}$ multiplexing unit circuitry comprises an $n^{th}$ multiplexing transistor, a control electrode of the $n^{th}$ multiplexing transistor is electrically coupled to the $n^{th}$ control end, a first electrode of the $n^{th}$ multiplexing transistor is electrically coupled to the $n^{th}$ output data line, and a second electrode of the $n^{th}$ multiplexing transistor is electrically coupled to the input data line.

6. A multiplexing method for the multiplexing circuitry according to claim 1, comprising:

enabling, by the $n^{th}$ multiplexing unit circuitry, the $n^{th}$ output data line to be electrically coupled to or electrically decoupled from the input data line under the control of the potential at the $n^{th}$ control end;

controlling, by the $n^{th}$ energy storage unit circuitry, the potential at the $n^{th}$ control end in accordance with the $n^{th}$ clock signal; and enabling, by the $n^{th}$ control unit circuitry, the $n^{th}$ control end to be electrically coupled to or electrically decoupled from the $n^{th}$ switch control line in accordance with the control voltage signal and the $n^{th}$ switch control signal, N being an integer greater than 1, and n being a positive integer less than or equal to N.

7. The multiplexing method according to claim 6, further comprising:

providing, by the $n^{th}$ switch control line, a first voltage signal, and enabling a potential of the $n^{th}$ clock signal to be changed from a second voltage to a first voltage, so as to change, by the $n^{th}$ energy storage unit circuitry, the potential at the $n^{th}$ control end, enable, by the $n^{th}$ multiplexing unit circuitry, the $n^{th}$ output data line to be electrically coupled to the input data line under the control of the potential at the $n^{th}$ control end, and enable, by the $n^{th}$ control unit circuitry, the $n^{th}$ control end o be electrically decoupled from the $n^{th}$ switch control line in accordance with the control voltage signal and the $n^{th}$ switch control signal; and enabling the potential of the $n^{th}$ clock signal to be changed from the first voltage to the second voltage, and providing, by the $n^{th}$ switch control line, a second voltage signal, so as to change, by the $n^{th}$ energy storage unit circuitry, the potential at the $n^{th}$ control end, enable, by the $n^{th}$ control unit circuitry, the $n^{th}$ control end to be electrically coupled to the $n^{th}$ switch control line in accordance with the control voltage signal and an $n^{th}$ switch control signal to discharge the $n^{th}$ control end, and enable, by the $n^{th}$ multiplexing unit circuitry, the $n^{th}$ output data line to be electrically decoupled from the input data line under the control of the potential at the $n^{th}$ control end.

8. The multiplexing method according to claim 7, wherein the $n^{th}$ control transistor in the $n^{th}$ control unit circuitry is an n-type transistor, the $n^{th}$ multiplexing transistor in the $n^{th}$ multiplexing unit circuitry is an n-type transistor, the first voltage is a high voltage, and the second voltage is a low voltage; or the $n^{th}$ control transistor is a p-type transistor, the $n^{th}$ multiplexing transistor is a p-type transistor, the first voltage is a low voltage, and the second voltage is a high voltage.

9. A multiplexing module, comprising a plurality of multiplexing circuitries, wherein each multiplexing circuitry comprises N multiplexing unit circuitries, N energy storage unit circuitries and N control unit circuitries, and N is an integer greater than 1, wherein a control end of an $n^{th}$ multiplexing unit circuitry is electrically coupled to an $n^{th}$ control end, a first end of the $n^{th}$ multiplexing unit circuitry is electrically coupled to an $n^{th}$ output data line, a second end of the $n^{th}$ multiplexing unit circuitry is electrically coupled to an input data line, and the $n^{th}$ multiplexing unit circuitry is configured to enable the $n^{th}$ output data line to be electrically coupled to or electrically decoupled from the input data line under the control of a potential at the $n^{th}$ control end;

a first end of an $n^{th}$ energy storage unit circuitry is electrically coupled to an $n^{th}$ clock signal end, a second end of the $n^{th}$ energy storage unit circuitry is electrically coupled to the $n^{th}$ control end, the $n^{th}$ energy storage unit circuitry is configured to control the potential at the $n^{th}$ control end in accordance with an $n^{th}$ clock signal, and the $n^{th}$ clock signal end is configured to provide the $n^{th}$ clock signal; and an $n^{th}$ control unit circuitry is electrically coupled to a control voltage end, the $n^{th}$ control end and an $n^{th}$ switch control line and is configured to enable the $n^{th}$ control end to be electrically coupled to or electrically decoupled from the $n^{th}$ switch control line in accordance with a control voltage signal and an $n^{th}$ switch control signal, the control voltage end is configured to provide the control voltage signal, and the $n^{th}$ switch control line is configured to provide the $n^{th}$ switch control signal, where n is a positive integer less than or equal to N.

10. A display device, comprising the multiplexing module according to claim 9.

11. The multiplexing module according to claim 9, wherein the $n^{th}$ energy storage unit circuitry comprises an $n^{th}$ storage capacitor, a first end of the $n^{th}$ storage capacitor is electrically coupled to the $n^{th}$ clock signal end, and a second end of the $n^{th}$ storage capacitor is electrically coupled to the $n^{th}$ control end.

12. The multiplexing module according to claim 9, wherein the $n^{th}$ control unit circuitry comprises an $n^{th}$ control transistor, a control electrode of the $n^{th}$ control transistor is electrically coupled to the control voltage end, a first electrode of the $n^{th}$ control transistor is electrically coupled to the $n^{th}$ switch control line, and a second electrode of the $n^{th}$ control transistor is electrically coupled to the $n^{th}$ control end.

13. The multiplexing module according to claim 12, wherein the $n^{th}$ control transistor is an n-type transistor, and the control voltage signal is a high voltage signal; or the $n^{th}$ control transistor is a p-type transistor, and the control voltage signal is a low voltage signal.

14. The multiplexing module according to claim 9, wherein the $n^{th}$ multiplexing unit circuitry comprises an $n^{th}$ multiplexing transistor, a control electrode of the $n^{th}$ multiplexing transistor is electrically coupled to the $n^{th}$ control end, a first electrode of the $n^{th}$ multiplexing transistor is electrically coupled to the $n^{th}$ output data line, and a second electrode of the $n^{th}$ multiplexing transistor is electrically coupled to the input data line.

* * * * *